United States Patent
Murad et al.

(10) Patent No.: US 6,271,762 B1
(45) Date of Patent: Aug. 7, 2001

(54) OCCUPANT POSITION SYSTEM AND METHOD USING ULTRASONIC TECHNOLOGY

(75) Inventors: Mohannad F. Murad, Royal Oak; James C. Lotito, Warren; Edward Burley, Troy; Joseph F. Mazur, Washington; Brian K. Blackburn, Rochester; Scott B. Gentry, Romeo, all of MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/259,753

(22) Filed: Feb. 27, 1999

(51) Int. Cl.$^7$ .................................................. G08B 21/00
(52) U.S. Cl. ............................................................ 340/686.1
(58) Field of Search ................................ 340/686.1, 667, 340/825.36, 825.49, 425.5, 438; 367/93, 94, 99, 100, 904; 280/734; 342/357, 450

(56) References Cited

U.S. PATENT DOCUMENTS

| | | | |
|---|---|---|---|
| 4,229,811 | * 10/1980 | Salem | 367/93 |
| 4,875,198 | * 10/1989 | Ariav | 367/99 |
| 4,975,889 | * 12/1990 | Petrucelli et al. | 367/99 |
| 5,323,361 | * 6/1994 | Elle et al. | 367/99 |
| 5,482,314 | 1/1996 | Corrado et al. | |
| 5,943,295 | * 8/1999 | Varga et al. | 367/99 |
| 5,973,996 | * 10/1999 | Zhevelev et al. | 367/99 |

FOREIGN PATENT DOCUMENTS

| | | |
|---|---|---|
| 4308373 | 9/1994 | (DE). |
| 0653644 | 5/1995 | (EP). |
| WO 9422693 | 10/1994 | (WO). |

* cited by examiner

*Primary Examiner*—John A. Tweel
(74) *Attorney, Agent, or Firm*—Markell Seitzman

(57) ABSTRACT

An apparatus and method of determining and tracking the position of a main target (an occupant) and secondary targets, comprising the steps of: transmitting a signal $T_1$, of determinable period toward the location of the occupant, generating and storing a first index of data indicative of the time any received signal exceeds a determinable threshold; separating the data within the first index into definable data groups indicative of individual received signals representing potential targets; determining, in relation to each transmitted signal $T_1$, a common group time of receipt $T_c$ for each data group; correlating the group time of receipt to the position of the main target and secondary targets occupant.

12 Claims, 6 Drawing Sheets

OCCUPANT POSITION SYSTEM AND METHOD USING ULTRASONIC TECHNOLOGY

BACKGROUND AND SUMMARY OF THE INVENTION

The present invention relates to an occupant position sensing system and more particularly to an occupant system which can identify and track the position of an occupant prior to and during an accident.

Occupant position sensing systems must be able to provide a signal indicative of the position of a main target, such as the torso of an occupant, while ignoring spurious signals that may arise from noise and other objects that might be perceived, by the sensing system, as secondary targets.

An object of the present invention is to design a sensing system and provide a method of operation which is able to track at least a main target, such as a moving occupant, within a vehicle during a crash.

A further object of the present invention is to provide an ultrasonic based sensing system.

Accordingly the invention comprises: An apparatus and method of determining and tracking the position of a main target (an occupant) and secondary targets, comprising the steps of: transmitting a signal $T_1$, of determinable period toward the location of the occupant, generating and storing a first index of data indicative of the time any received signal exceeds a determinable threshold; separating the data within the first index into definable data groups indicative of individual received signals representing potential targets; determining, in relation to each transmitted signal $T_1$, a common group time of receipt $T_c$ for each data group; correlating the group time of receipt to the position of the main target and secondary targets occupant.

Many other objects and purposes of the invention will be clear from the following detailed description of the drawings.

DETAILED DESCRIPTION OF THE DRAWINGS

Figure 1:
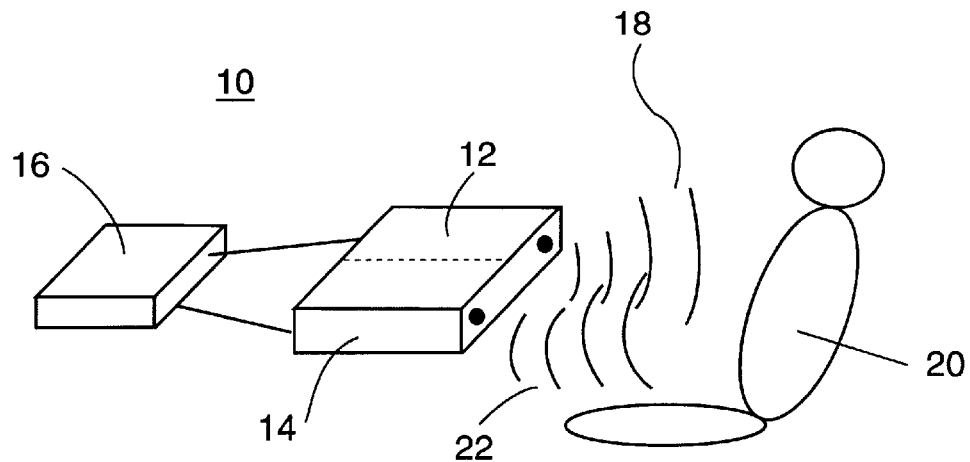
FIG. 1 shows an ultrasonic distance measuring system.

Reference is made to FIGS. 1–4, which illustrate an occupant position system 10. The system includes a transmitter 12 and a receiver 14. The transmitter and receiver are controlled by a control unit 16 which is used to activate the transmitter, receive the echo or reflected signal and calculate the occupant's position. The transmitter 12 and the receiver are analogous to a speaker and microphone found in many acoustic systems. As can be appreciated one physical device or sensor can operate both as the transmitter and the receiver or separate components, as illustrated, can be used. In general, the transmitter will generate an ultrasonic pulse or burst of pulses 18 at or centered about a predetermined frequency $f_0$, typically about 40 kHz. The duration of the transmitted signal is shown as $T_1$. This signal, as graphically illustrated in FIG. 1, will strike an occupant 20 and the reflection 22 will be reflected back during interval $T_2$, toward the receiver 14. The receiver 14 senses or collects the reflected signal 22 and communicates it to the control unit 16. The control unit 16 determines the time differential between transmission and reception of the reflected signal and calculates the distance between the occupant and the location of the transmitter/receiver unit. The control unit may include means for compensation for environmental factors which affect the speed of sound such as temperature and humidity.

Figure 2:
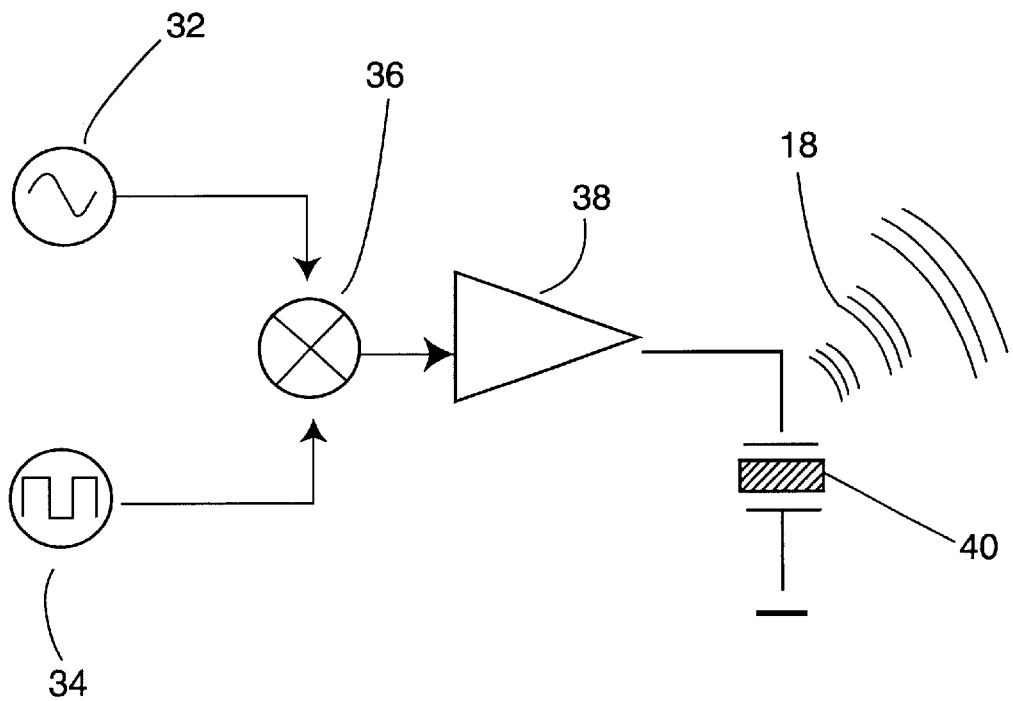
FIG. 2 illustrates an ultrasonic transmitter.
Figure 3:
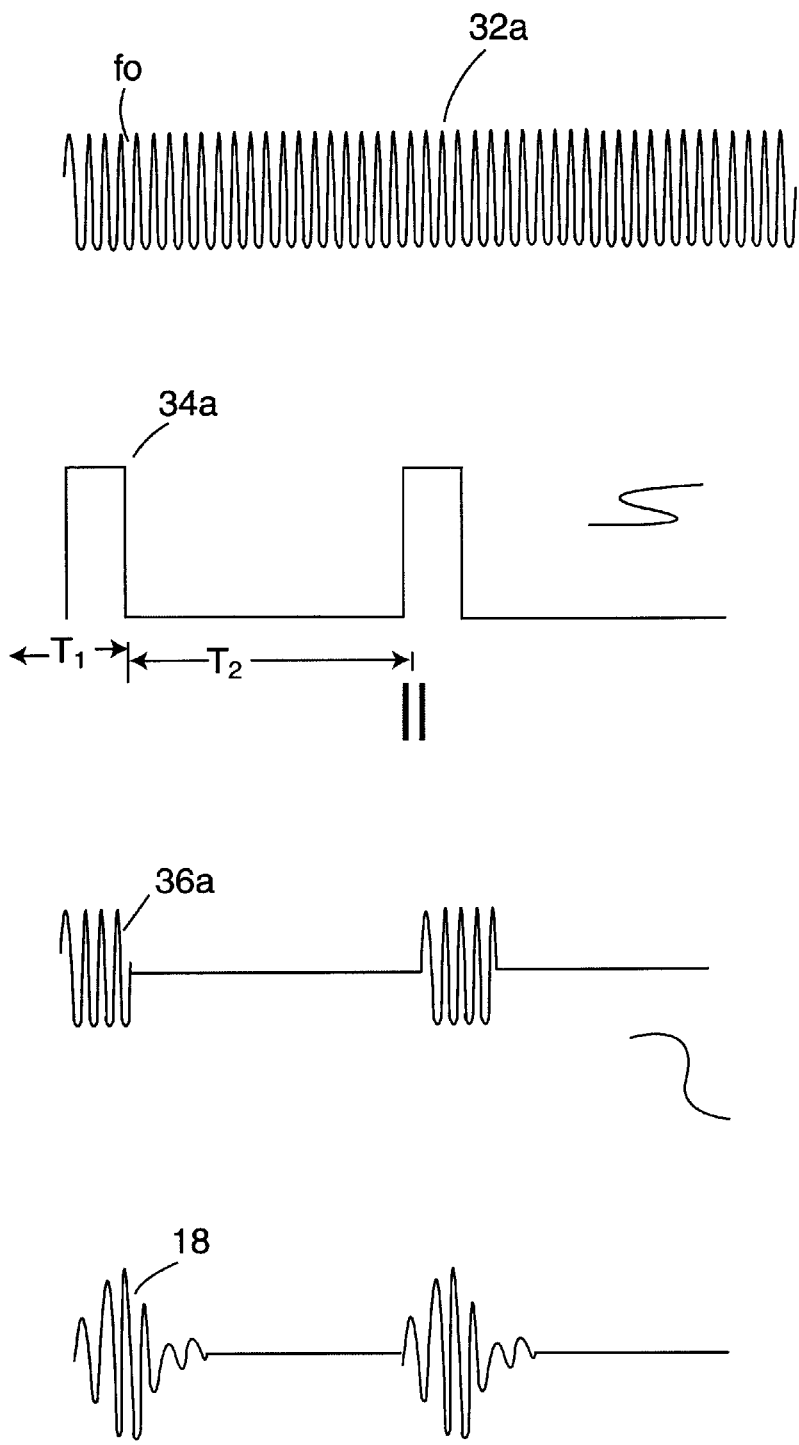
FIG. 3 shows various system waveforms.

Reference is briefly made to FIG. 2 which illustrates a typical ultrasonic transmitter 12. The transmitter 12 includes a sinusoidal oscillator 32 operating at frequency $f_0$, a pulse generator 34, multiplier circuit 36, an amplifier 38 and a piezoelectric transducer 40. Other transducers such as magnetostrictive may be substituted. The output of the multiplier 36 is a pulse-modulated signal (line 3, FIG. 3) resulting from multiplying the sinusoidal signal 32a (line 1, FIG. 3) and the pulsed signal 34a (line 2, FIG. 3) emanating from the sinusoidal oscillator and pulse generator respectively. The pulse-modulated signal 36a is appropriately modified by the amplifier 38, if used. It is this signal which excites the transducer 40. The output of the transducer 40 will vary slightly from the pulse modulated waveform and depend upon the physical characteristics of the transducer 40 as discussed below and is shown in line 4, FIG. 3. In general, the pulse modulated wave 36a and the output of the transmitter are waveforms which have period equal to $T_1+T_2$. In the present invention the total period of the transmitted signal $T_1$ and the echo $T_2$ is approximately 5 milliseconds, and $T_1$ is about 250 micro-sec. The pulse modulation permits the ultrasonic wave to be broadcast during a first duration or period $T_1$. The transmitter is essentially turned off during the second duration or period $T_2$. $T_2$ is also referred to as the listening time of the receiver 14.

Figure 4:
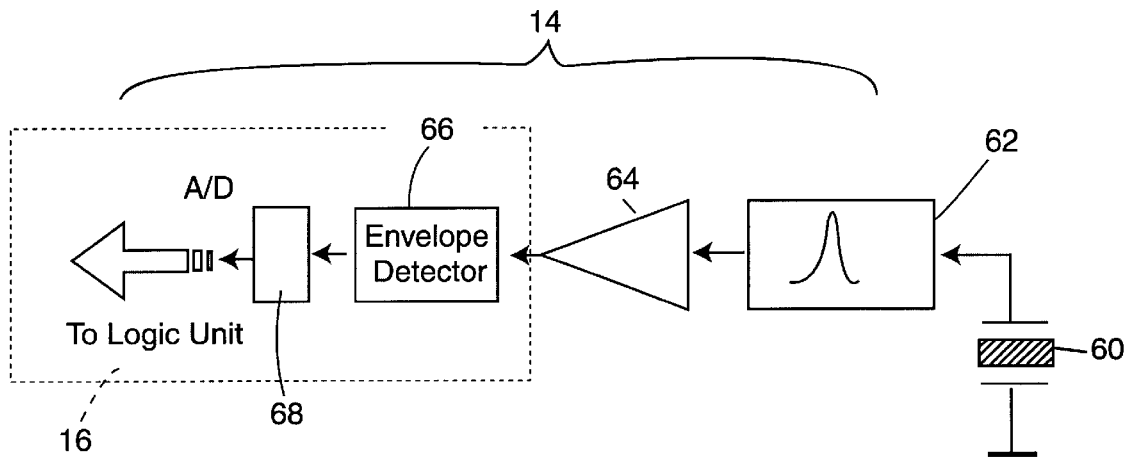
FIG. 4 shows an ultrasonic receiver.

Reference is now made to FIG. 4 which illustrates the receiver 14 of the present invention. The receiver preferably comprises a low-cost electromechanical, piezoelectric transducer 60, the output of which is received by a band pass filter 62. Other transducers may be substituted. The output of the band pass filter 62 is communicated to an amplifier 64 which feeds an envelope detector 66. The output of the envelope detector is fed to an analog-to-digital converter 68 and then to the control unit 16. The transducers 40 and 60 can be identical and as mentioned below one transducer can be used as both the transmitting element and the receiving element.

Both the electromechanical transmitting transducer 40 and the electromechanical receiving transducer 60 oscillate or are forced to oscillate at determinable frequencies. Oscillatory systems, whether electrical or mechanical, can be described by a Q factor. This factor is often called "quality factor." In other contexts it is called the "sharpness of resonance." As can be appreciated, the higher the Q value of a circuit or a transducer, the lower the driving power levels, energy or force needed to excite and drive the transducer. As can be appreciated, the piezoelectric transducer 40 will oscillate at a predefined frequency or band of frequencies dependent on the Q-factor. With regard to the transmitting transducer 12 its Q-factor can be high or low, each approach has its inherent benefits and detriments. However, with regard the receiving transducer 60 of the present invention, it is preferable that it be characterized as a low Q element. Consider the following: were the transducer 60 designed to be a high Q element, then any noise such as resulting from a high slew rate modulation in the passenger compartment will cause the transducer 60 to oscillate. High slew rate noise can be characterized as broadband noise. This type of noise can arise for example, by turning the radio on and off at full power to the speaker. This oscillation may induce error in the determination or calculation of the distance d, between the air bag (the location of the transmitter 40) and the occupant. This noise can result from mechanical or electrical sources and may be transmitted by conduction or radiated through the air. Spurious excitation may also arise because of the cross coupling between the transmitter 12 and receiver 14.

Mechanical or electrical components with a very high Q factor are extremely oscillatory and are susceptible to being excited by unwanted signals or signal components. While a high Q transmitter is usable with the present invention a lower Q transmitter is preferred. Consider for the moment line 4 of FIG. 3. With a high Q transmitter 12 the transducer 40 may continue to resonate even after it is turned off. This resonance extends into period $T_2$, that is, the listening time of the receiver 14. This oscillation may be sensed by the receiver 14 and identified by the control unit 16 as a valid reflected signal indicative however of, an incorrect position.

Figure 5:
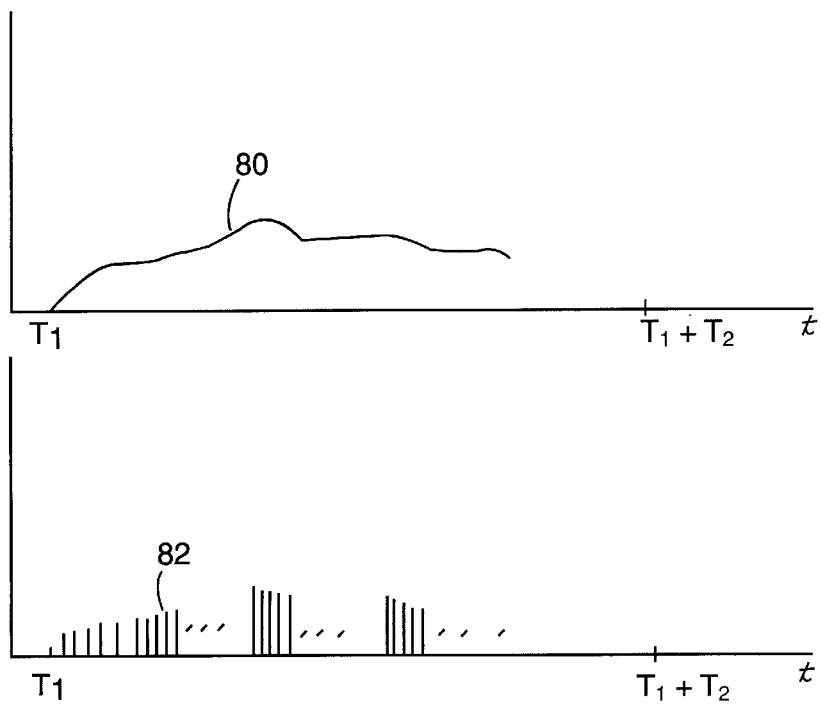
FIG. 5 shows an output signal generated by the receiver.

In the present invention the receiving element 60 is also characterized by a low Q factor. Based upon testing it has been found that adequate receiver response can be characterized by a Q of less than 5, with, a Q of approximately 1 is preferable, however, a receiving element with a Q of about 20 is acceptable. The receiving element 60 will convert mechanical sound energy into electrical energy. Implicitly, the low Q factor means that the frequency response of the receiving transducer 60 will be broadband centered about the transmission frequency $f_0$. As such, the power or magnitude associated with the frequencies on either side of the center or design frequency $f_0$ are relatively attenuated. The broadband electrical signal emanating from the acoustic transducer or receiver 60 is filtered by the band pass filter 62. In the present invention filter 62 is a narrow band filter centered at the transmitted frequency $f_0$. In this manner, the filter 62 attenuates noise or other signals that do not have the transmitted frequency $f_0$. The filtered signal is amplified (at 64) and passed to an envelope detection circuit 66, the output of which is shown on line 1 of FIG. 5 and identified as numeral 80. The output of the A/D converter 68 is a digital value which corresponds to the output of the envelope detector. In the present invention, the A/D converter samples the analog input signal at a clocking rate determined by the control unit 16. The sampling speed in the illustrated embodiment is about 5–20 micro-seconds, which may correspond to the internal clock of the control unit 16 which will yield between about 50–250 data points in the interval $T_2$ (of course dependent upon the duration of this interval) This data is used to calculate the position of the occupant and is shown on line 2 of FIG. 5 as numeral 82. It should be appreciated that all or some of the circuitry of FIG. 4 can be part of the control unit 16 or as illustrated can be separate components.

Figure 6:
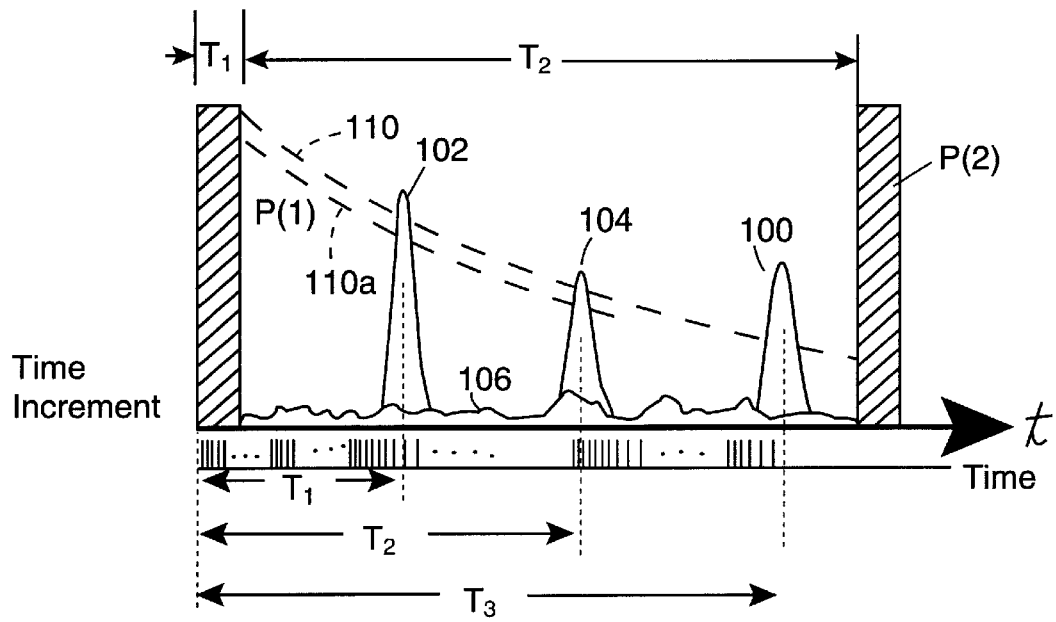
FIG. 6 shows illustrative transmitted and received signals.

Reference is made to FIG. 6 which shows a typical transmitted pulse or signal P(1) of duration $T_1$ and a number of signals received within the listening time of duration $T_2$. Shown in the interval $T_2$ are three items of reflected energy. These pulses may have been generated by, for example a reflected pulse 100 off of a main target, a noise pulse 102, or another pulse 104 that may have been reflected off of a secondary target. Numeral 106 represents a low level noise signature. As will become apparent, the present invention defines a methodology and apparatus to detect a main target, the ability to lock onto the main target and track it as well as the ability to filter out noise and other less significant potential targets. In the context of an occupant position system, a second target might correspond to the movement of a hand or the placing of a book in front of the transmitter 12. Also, superimposed upon the waveform is the variable threshold 110 which may or may not be exceeded by the incoming pulses.

As can be seen the magnitude of the threshold 110, in this embodiment, decreases with time, this is, the time T,c, to receive the echo or reflected signal (which is equatable to the distance to the occupant). By way of illustration the three received signals 100, 102 and 104 are shown as being received at times $T_c=t_1$, $t_2$ and $t_3$ respectively. This variation in threshold magnitude relates the fact that the reflected signal or echo will be stronger, i.e. a high magnitude, if the occupant is positioned close to the transmitter 12 and receiver 14 and that any effect of dispersion or beam angle of the transmitted ultrasonic wave 18 and a reflected wave 22 and any attenuation or variation of the speed of the transmitted signal are low. Consequently if a valid signal were detected at, for example, time $T_c=t_1$ the magnitude of the signal should exceed a large value as the occupant is in close proximity to the transmitter 12. If however, the reflected signal were received at, for example, a time $T_c=t_2$, where $t_2$ is a longer duration than $t_1$, the magnitude of the received signal would be correspondingly reduced. As such, a variable threshold, such as 110 is chosen which requires the received signals to exceed a larger threshold, if received in a small time period. The variable threshold is also reduced to account for the expected attenuation in the magnitude of the reflected signals which take longer to be received (and which correspond to larger measured occupant distances). A fixed or constant threshold can be used. The threshold, rather being a line as shown, can be an area between upper and lower thresholds 110 and 110a (see FIGS. 6 and 7). The actual threshold can also be linearly decreasing or curved as shown. The desired threshold would be chosen empirically based on testing of the particular transmitter and receiver. Positioned below the horizontal axis of FIG. 6 is a time increment which is used to divide the pulse period $T_1+T_2$ into a number of intervals, such as 110.

Figure 7:
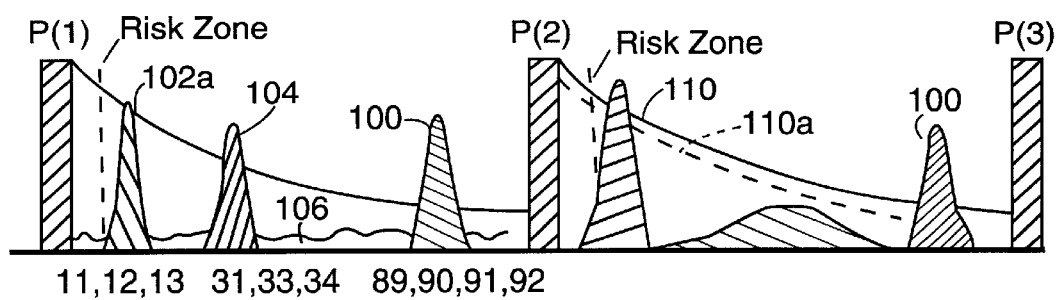
FIG. 7 shows a series of transmitted and received signals.

FIG. 7 also illustrates a plurality of other transmitted signal pulses P(1), P(2) and P(3) each of duration Ti and the reflected waves that might be received during subsequent listening intervals $T_2$. FIG. 7 also identifies a "risk zone" which is located at the beginning of the listening period $T_2$. As should be appreciated, any signals received at the beginning of period $T_2$ mean that the detected object or target is extremely close to the transmitter 12 (which also means that the object or target is very close to the location of the air bag).

Figure 8:
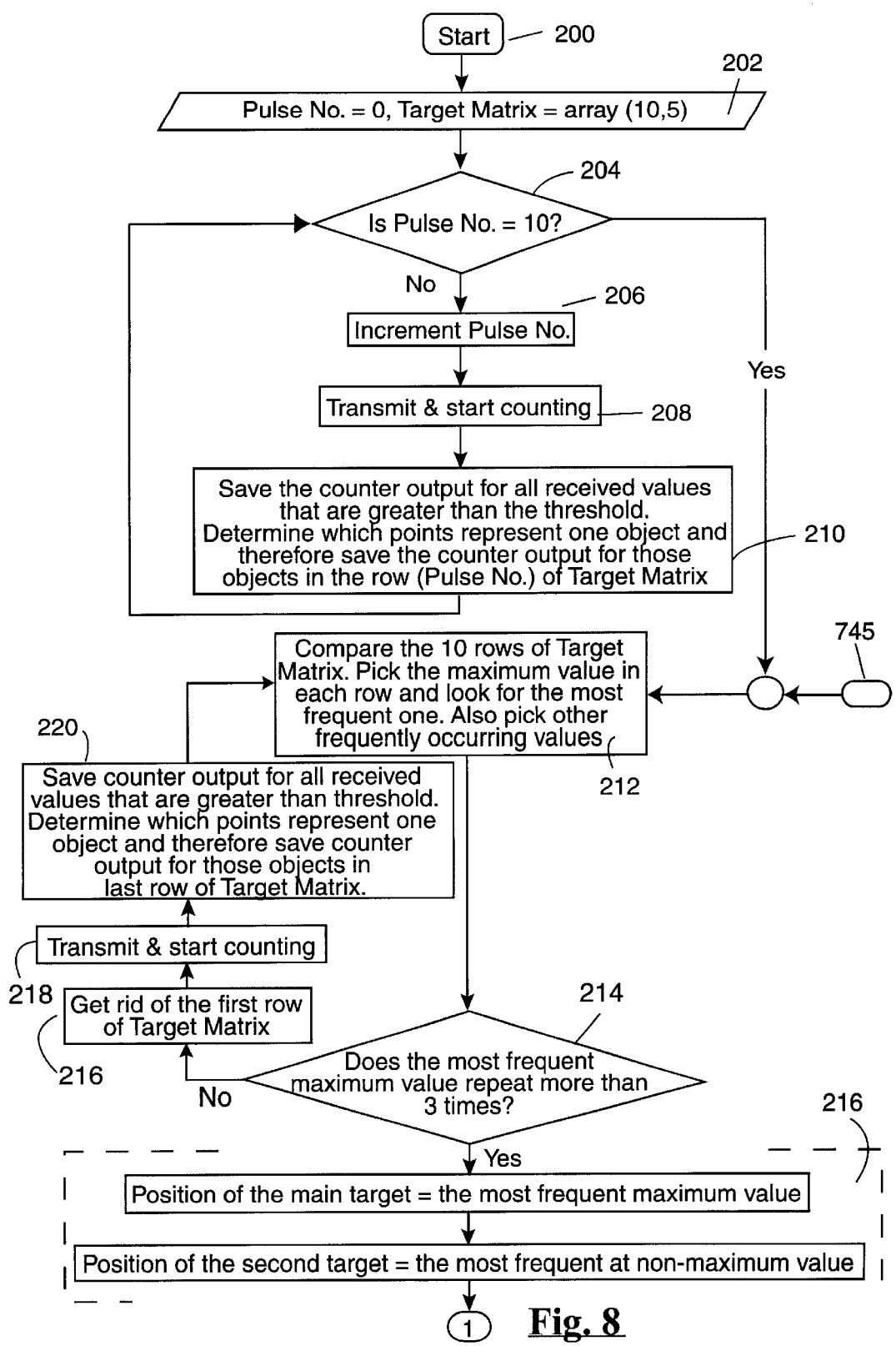
FIGS. 8 and 8a are flow charts illustrating the operation of the system.
Figure 8A:
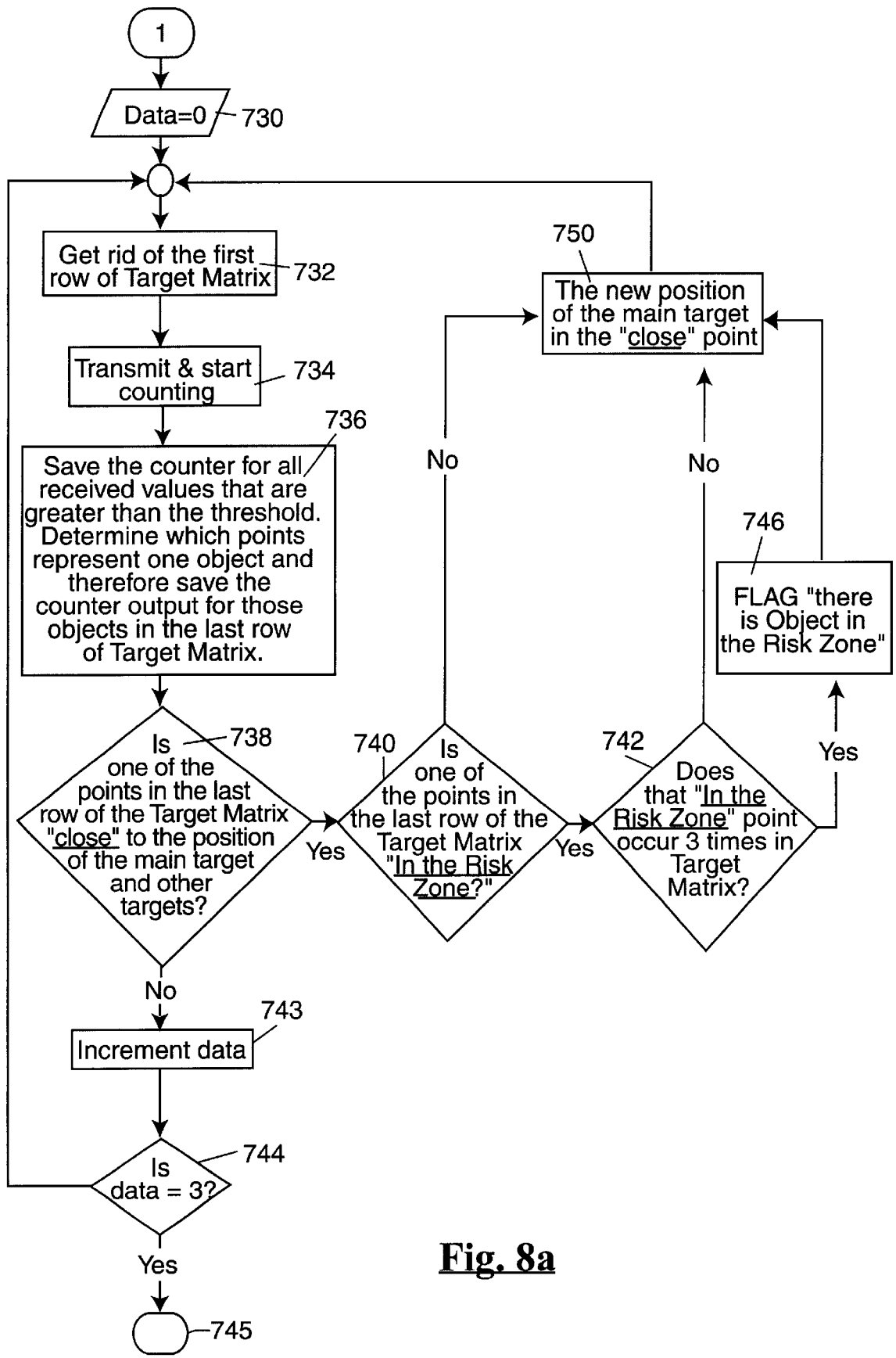

Reference is again made to FIG. 7 as well as to FIGS. 8 and 8a. The control unit 16 employs a constant timer which updates an interval counter (see FIG. 6) to be able to identify the time when a received signal, caused by the main target, noise, a secondary target, etc., is received by the receiver 14. FIG. 7 also includes a number of numerals noted below the three reflected echoes (received signals) received within the listening period $T_2$. In this example, portions of each of these echoes exceed the threshold 110 for some period of time. In the illustrated embodiment of the invention a timer within the control unit 16 will generate 110 sequential pulses during the interval $T_1+T_2$. The numerals below each of the three pulses 102 (acoustic noise), 104 (secondary target) and 100 (main target) identify the time increment, or pulse or number during which the magnitude of the reflected or received signal exceeds the threshold 110.

For the purpose of example, signal 102 exceeds the threshold for pulses or intervals 11, 12 and 13. Pulse 104 exceeds the threshold for pulses or intervals 31–34. Finally, the pulse 100 exceeds the threshold for pulses or intervals 89–93. As discussed below, the system will be able to identify these (and other) received signals occurring within the interval $T_2$ and is able to isolate and track a main target, that is, the upper torso of the occupant.

To accomplish this target identification and tracking, the system collects information regarding targets and pseudo targets based upon the received signals during ten transmit and receive cycles. The target-tracking algorithm, see FIGS. 8 and 8a, begins with an initialization or start block 200. The first step in the algorithm is to zero a 10×5 element target matrix TM and to set a pulse number P(n) counter or parameter as zero (see block 202). Block 204 tests to see if the tenth transmit pulse P(10) has been sent by the transmitter 12. If it has not (see block 206), the pulse number P(n) counted is incremented. In this example, the pulse count P(n) is incremented from zero to one. Subsequently, the control unit 16 causes the transmitter 12 (see block 208) to transmit the first pulse P(1) (for duration $T_1$) and begins counting the time increments which will vary from one through 110, as previously mentioned. The control unit 16 monitors the output of the receiver 14 (see block 210) and saves the time increment (number or count) for all received signal values that are greater than the threshold 110 and determines which data represents individual objects and then saves the respective time increment (pulse or number) for those individual objects in a selected row of the target matrix. The contents of the target matrix TM, prior to transmitting the first transmit pulse P(1), is shown below. This matrix is a null matrix.

$$\text{Target matrix} = \begin{matrix} 0 & 0 & 0 & 0 & 0 \\ 0 & 0 & 0 & 0 & 0 \\ 0 & 0 & 0 & 0 & 0 \\ & & \cdots & & \\ 0 & 0 & 0 & 0 & 0 \end{matrix}$$

In the example shown in FIG. 7 above, the three received signals (representing targets, noise, etc.) exceeded the threshold for intervals or counts 11–13, 31–34, 89–93.

The control unit 16 stores the time increment or count index (again at those time intervals when a received signal has exceeded the threshold) and then attempts to index this data into specific information representing individual received signals. In order to isolate information originating with each discrete received pulse, the control unit 16 will inspect the stored index of time increments or counts, such as intervals or counts 11–13, 31–34, 89–93. If any pulse or interval count is separated from a previous pulse count by, for example, five counts or intervals, the control unit 16 will equate the subsequent count, or series of subsequent counts, as being originated by a second target (which may or may not be generated by noise or reflected by a part of an occupant). As an example, in the above data string, since the difference between counts 11–13 varied by only one count, the control unit 16 will lump these three counts together, that is 11, 12 and 13, as being indicative of a first reflected signal. However, since the interval between 13 and the subsequent received signal indication, i.e. count 31 is greater than five, the control unit 16 will segregate all counts after 31 as associated with a second received signal (until of course there is again a separation of another five (5) intervals or counts). As can be seen, the data index or string can be separated into three distinct groupings of counts or intervals, the first being 11, 12, 13, the second 31, 32, 33, 34, and the third 89, 90, 91, 92, 93. Thereafter, the control unit 16 will determine an average value for each cluster of increments (counts or numbers) and insert the respective average into the first line of the target matrix. Assuming, for example, that the average value of each of the first three clusters of information is 12, 33 and 91, the first line of the target matrix is updated as follows. As a result of the first transmitted signal, the target matrix is as follows:

$$\begin{matrix} (12) & (33) & (91) & (0) & (0) \\ 0 & 0 & 0 & 0 & 0 \\ & & \cdots & & \\ 0 & 0 & 0 & 0 & 0 \end{matrix}$$

The above process is repeated for ten transmitted signals P(1)–P(10), thereby filling in each line of the target matrix.

An exemplary completed target matrix (as established by block 210) for the initial ten transmitted and received signals is shown below.

$$TM = \begin{matrix} (12) & (33) & (91) & (0) & (0) \\ (5) & (35) & (95) & () & (0) \\ (5) & (96) & () & () & (0) \\ (37) & (94) & () & () & () \\ & & \cdots & & \\ (15) & (32) & (98) & () & (0) \end{matrix}$$

The algorithm continues by investigating the completed target matrix and determines the maximum value in each row (see block 212) and then determines if this maximum value has been repeated a determinable number of times in essence to insure the quality of the conclusions based on the received data. In the present example, the algorithm tests to see if the maximum value has been repeated three times (3x) as shown in block 214. As can be appreciated other values can be used. If the test in block 214 is satisfied, then the position of the main target is identified as the last (higher interval number) most frequently occurring value (see block 216). If the test in block 214 cannot be satisfied, the first line of the target matrix is eliminated (this line represents the oldest information) and the a new line of data added (as line 11) to the target matrix corresponding to the interval counts achieved during the next or 11$^{th}$ transmitted signal P(11) (see blocks 216 and 218). It should be appreciated that the target matrix remains a 10×5 matrix. Thereafter, the control unit 16 accumulates the time intervals or counts as was done in block 210 (also see block 220) and groups or clusters the received data to identify the time (or the count) during which a new reflected signal or signals exceeds the threshold. The replacement of subsequent rows of the target matrix, that is row 2, row 3, etc. (and the corresponding addition of new rows 12, 13, etc.), continues until the test in block 214 is satisfied.

The test enumerated in block 214 seeks to determine if the most frequent maximum value repeats three times. As can be seen by the completed, exemplary target matrix, none of the entries therein are replicated three or more times. To assist in the data acquisition, the time period $T_1+T_2$ is divided into 11 sub-intervals, each having ten counts. As such, the test performed in block 214 can, in the alternative, be stated whether or not a maximum value occurs in one of the predefined intervals three or more times. As can be seen from the complete target matrix, the maximum values of each line occur between count interval 91 and 100. The mid range of this band, that is Tc =95, is used as the time value that is indicative of the position of the main target. In the context of the present invention and utilizing equation one, the count of 95 represents that the main target is approximately 700 millimeters from the transmitter 12. This can be derived from the following equation:

$$d=(V_s*T_c)/2 \quad (1)$$

where d is the distance to the occupant from the transmitter 12, $V_s$ is the speed of the sound (as adjusted for temperature and humidity).

Having acquired the main target, the algorithm now attempts to track the position of that target during subsequent transmitted pulses. With reference to FIG. 8a, the algorithm zeros a data counter DC(n) at zero (see block 730). Thereafter, the first row of the completed target matrix is eliminated (see block 732). Subsequently, the control unit 16 causes the transmitter 12 to emit an additional pulse (see block 734) and the control unit will now, as it did before, count from one through its maximum value of 110. Thereafter, the control unit (see block 736) saves the timer values whenever the received signal output is greater than the threshold value 110 and determines which stored counts or intervals represent a single object and saves the counter output of those objects as a new and last row of the 10×5 target matrix. For example, the following illustrates one such subsequent data set:

(12 13 14) (32 33 34) (97 99) (106 108)

The control unit will review this data and group the data in clusters representing received or reflected signals and thereafter determine the average value of these groups or clusters of data to be inserted into the last row of the matrix. As a result of the above, the computer will enter 12 33 98 107 0 in the last row of the target matrix. If one of these entries in the last row of the target matrix (see block 738) is within a predetermined range of the position (count number) of the main target determined in block 216, the algorithm enters block 740. As can be seen, the third entry, 98, of this last line of information in the target matrix is within the predetermined permitted difference or range PD(n). The predetermined range as mentioned above is determined as follows. Based upon actual crash data of vehicles, the maximum rate at which an occupant can move or can be moved can be ascertained. As an example, in a severe crash resulting is a change in vehicle velocity of about 67 kph (42 mph) it can be shown that a $50^{th}$ percentile occupant will move at a velocity of about 5 m/s. The time increment between two transmitted pulses in the preferred embodiment of the invention is about 5 msec. Assuming that the occupant is moving at his or her fastest speed, then the distance moved is about 5 m/s*5 msec=2.5 cm. For example, if the maximum distance measured (between the transmitter 12 and the occupant)is about 1 meter, and the total number of counts the timer can is set to count is 110 (in the embodiment), then the distance 2.5 cm represents an increment or decrement in the timer output of about 0.025*110 are about 3 counts (either closer or farther from the transmitter). Consequently, if after identifying what is believed to be the position of the occupant, the determination in block 738 reveals that the occupant has changed his position by an amount that is not physically realizable, this data point is not used and the system is incremented to enter block 742.

If, however, none of the entries on the last line of this matrix is within the predetermined difference PD, relative to the position of the main target, this can relate to one of the following instances: that the system has lost the main target, or that a spurious signal has been generated which corrupted the determination of the distance to the main target. If this is the case, block 743 is entered and the data variable DN is incremented from zero to one. Thereafter, the steps in blocks 732, 734, 736 and 738 are repeated. If one of these data points falls within the predetermined difference relative to the position of the main target as determined in block 216, block 740 is entered. If block 742 is entered for example three times, that is, the data variable DN is incremented to a value of three (3) (see block 744), the main target detection step as defined in block 212 is completely repeated. This transition is shown by entering block 745. In other words, if the data variable is so incremented, this will mean, that the target has been lost and the steps in blocks 212, 214 and 216 must be repeated to reacquire the main target.

Assuming that the system has successfully identified the initial position of the main target in step 216, and has determined a later position of the main target in block 738, that is, the position of the main target which has not varied substantially from its earlier determined position, the algorithm, in block 740, tests to see if any of the data points in the last row (the most recent data) of the target matrix is within the "risk zone". As can be appreciated, the information in the last line of the target matrix includes the most recent position of the main target, information perhaps about a secondary target and information contained in noise signals. Thereafter, in block 742, the current target matrix, or rather this last line of the matrix, is analyzed to see if there exists data or cluster of data points (very low counts) which are located in the risk zone, for example if a target or potential target is within 0–13 cm of the transmitter 12. The data is tested to see if these low counts exist for a predetermined number of times, for example three times. If this is the case, a flag or warning signal is generated to the control unit 16 (see block 746). This warning signal may indicate that the main target, or a secondary target, or continued noise has resulted in this occurrence. An air bag control unit must will them determine whether: a) to cause the air bag to inflate at a high or lower levels of inflation or b) to negate the activation of the air bag because of the presence or the potential presence of an occupant that is too closely positioned relative to the air bag. Regardless of the outcome of the tests in block 740, 742 and 746, the position identified in block 738 is used as the new or more current position of the main target (see block 750). Thereafter, the main target is continued to be tracked by repeating steps 732, 734, 736, 738, etc.

As can be seen from the above, the system has chosen the main target to be the last recognized target or cluster of points from the completed target matrix. As can be seen from this matrix, there is also a cluster of data points which may indicate the presence of a secondary target. These data points are represented by points 33, 35, 37, 32. Block 212 can also be used to find other frequently occurring data clusters (rather than the maximum value which corresponds to the target at the farthest distance) and to see if this secondary target data has reoccurred three (or more) times (see block 214). This value could be indicative of the secondary target. Thereafter the control unit can track this secondary target as was done in blocks 730–750 for the main target.

Many changes and modifications in the above-described embodiment of the invention can, of course, be carried out without departing from the scope thereof. Accordingly, that scope is intended to be limited only by the scope of the appended claims.

What is claimed is:

1. A method of detecting one or more objects including an occupant of a vehicle and identifiable parts of the occupant, comprising the steps of:

a) transmitting a first pulse having a determinable signature in the direction of an occupant;

b) establishing a received signal threshold;

c) sensing a received signal reflected from an object including a received signal reflected from the targeted occupant;

d) determining when the amplitude of the received signal exceeds the threshold and storing numbered time increments during which the received signal exceeds the threshold;

e) evaluating the stored increments and grouping contemporaneous increments together, each group of increments being indicative of one target which reflected the first pulse;

f) determining a first group of increments, from those grouped in step e, corresponding to the highest numbered increments and correlating same with the position of the torso of the occupant.

2. The method as defined in claim 1 including a step g) of isolating a target other than the torso of the occupant.

3. The method as defined in claim 2 wherein step g) includes identifying a second group of increments having a value less than that of the first group and correlating this second group with a second target that is spaced forward of the torso of the occupant.

4. The method as defined in claim 1 including a step h) of obtaining a first average value of the first group of increments and identifying this first average value with the position of the torso of the occupant.

5. The method as defined in claim 4 including a step i) of obtaining a second average value of the second group of increments and identifying this second average value with the position of the second target.

6. The method as defined in claim 5 including rapidly repeating step a through step i) to obtain subsequent first and second average values corresponding to each newly transmitted signal.

7. The method as defined in claim 6 including a step j) of recomputing the value of the first average value by repeatedly transmitting signals and recomputing the first average value of the received signal until a predetermined number of subsequent compilations of the first average value are substantially equal and then using this compiled first average value as the first average value, that is, as an indication of the position of the torso of the occupant.

8. The method as defined in claim 6 including a step of tracking the position of the occupant's torso, wherein this step of tracking includes:

step k) of recomputing the first average value and comparing same to the compiled first average value and step l) comparing the difference between the first average value in step k) with the compiled average value, then if the difference is less than a predetermined difference, using the average value from step k) as an indication of the new position of the torso of the occupant.

9. The method as defined in claim 3 including a step of determining if any target is within a risk zone, that is, too close to a location of an inflatable air bag, by comparing the first and second average values to a low limit value which corresponds to a minimum safe position between the air bag and the respective target.

10. The method as defined in claim 9 including the step of modifying the performance of the air bag if any target is within the risk zone.

11. The method as defined in claim 1 wherein the received signal threshold is a variable threshold.

12. A method of detecting the position of a main body part of an occupant as being a main target and tracking this main target while other secondary objects are placed partially in front of it, the method comprising the steps of:

A) transmitting an ultrasound pulse of a determinable period toward the occupant, and starting a time counter;

B) capturing the time count generated by the time counter whenever any received signal exceeds a determinable threshold;

C) separating and analyzing the previously captured time counts to determine how many objects are located at different distances and then calculating these different distances;

D) depending upon how many objects were detected, moving a sensing threshold level up or down, to compensate for different reflection factors resulting from different reflection materials, until a reasonable number of objects has been detected;

E) building a history of objects detected at different distances for several transmission periods;

F) analyzing this history to determine the position of the main body as being the most furthest object seen as a result of the history;

G) updating this history after every transmit period and continuing to analyze it to lock onto the position of the main body while ignoring other secondary objects placed in front of it;

H) flagging the system whenever a secondary object is being seen repeatedly within an Automatic Suppression Zone;

I) repeating the process of building and analyzing a history of objects detected any time the system determines that it has lost its main target.

* * * * *